United States Patent

[11] 3,613,788

| [72] | Inventor | George J. Kautsky |
| | | Los Angeles, Calif. |
| [21] | Appl. No. | 48,387 |
| [22] | Filed | June 22, 1970 |
| [45] | Patented | Oct. 19, 1971 |
| [73] | Assignee | Textilana Corporation |
| | | Hawthorne, Calif. |

[54] METHODS FOR THE TREATMENT OF TERRESTRIAL FLUID RESERVOIRS
20 Claims, 1 Drawing Fig.

[52] U.S. Cl. .................................................. 166/279,
166/305 R, 252/8.55 B
[51] Int. Cl. .................................................. E21b
[50] Field of Search .......................................... 166/279,
305 R, 310; 252/8.55 B, 180; 210/58

[56] References Cited
UNITED STATES PATENTS

| 3,336,221 | 8/1967 | Ralston | 252/8.55 B X |
| 3,467,192 | 9/1969 | Nolan et al. | 166/279 |
| 3,481,869 | 12/1969 | Jones | 252/8.55 B X |
| 3,483,925 | 12/1969 | Slyker | 166/279 |

*Primary Examiner*—Ian A. Calvert
*Attorneys*—Philip Subkow and Kendrick and Subkow ABSTRACT: This invention relates to methods for the treatment of aquifers and oil and gas formations by injection thereinto of polyalkylene polyamino polykis methylene phosphonic acids and their salts to prevent scale and inhibit corrosion.

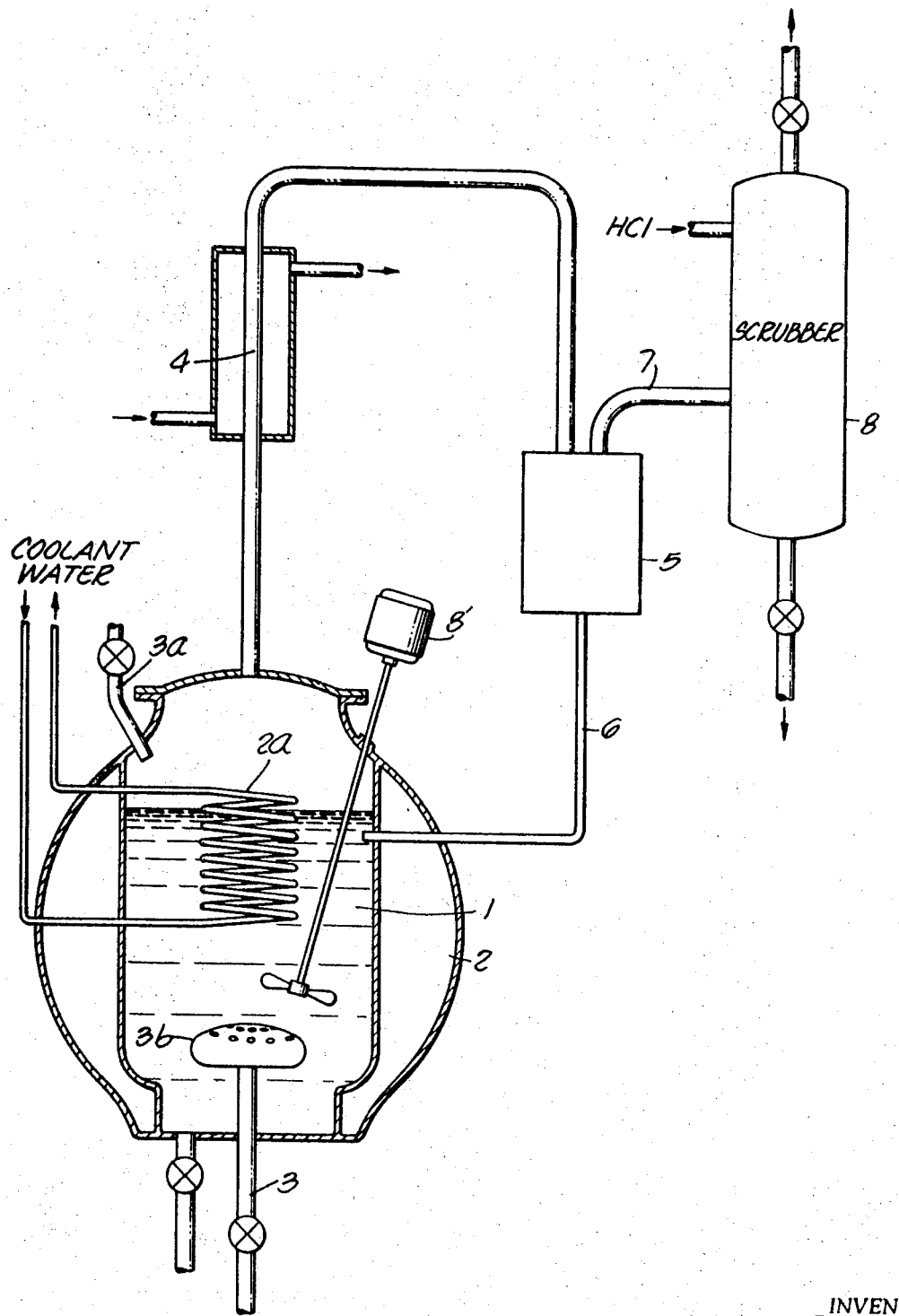
INVENTOR.
GEORGE J. KAUTSKY
BY KENDRICK and SUBKOW
ATTORNEYS

METHODS FOR THE TREATMENT OF TERRESTRIAL FLUID RESERVOIRS

The fields to which the invention relates include compounds which have the property of inhibiting the precipitation of salts from waters containing the same and processes for prevention of formation of scale such as calcium carbonate, calcium sulfate and barium sulfate, in systems where such scale is encountered.

This invention also relates to a process for inhibition of corrosion of ferrous bodies.

This invention relates particularly to a process for sequestration of cations such as iron, copper and aluminum.

This invention also relates to the treatment of oil, water and gas wells to inhibit scale depositions in formations on well surfaces.

The severity of scaling increases with the concentration of the precipitating ions $Ca^{++}$ and $SO_4^{11}$ or $CO_3^{11}$; or $Ba^{++}$ and $SO_4^{11}$) and with the temperature of water. Calcium sulfate and carbonate, as well as barium sulfate, exhibit inverse solubility with respect to temperature.

Scale is known to obstruct passage of water and oil in producing wells and in the oil-bearing formations. It leads to thick deposits in heat exchangers and boilers, causing a poor heat transfer. It plugs filters. It plugs pores in sand and rock formations and thus causes an increase in line pressures and increase of resistance in water disposal and in secondary oil recovery systems, requiring a general increase in pressure. Scale contributes to corrosion in pipe lines and water lines.

Corrosion in turn accelerates the buildup of scale deposits; corroded, rough surfaces offer sites for scale crystals to adhere. The combination of corrosion and scale crystal growth leads to costly failures in industrial equipment.

As will be shown below, the compounds of my invention are corrosion as well as scale inhibitors, and thus they have the dual function of inhibiting the deposition of scale and protecting against corrosion, which cooperates in the prevention of scale and the prevention of plugging permeable systems, such as oil and water natural reservoirs.

This invention relates to compounds of the general formula:

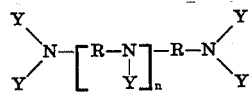

where

is an alkylene amino methylene phosphonic acid moiety of a polymeric alkylene amine methylene phosphonic radical containing $n$ moieties, where R is an alkylene radical in an uninterrupted chain of from at least two carbons up to and including 12 carbons, and $n$ is from 1 to 5 moieties, in which at least one of the moieties contains an $R$ of at least six carbon atoms, and Y is a methylene phosphonic acid radical:

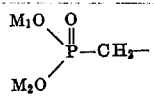

where $M_1$ and $M_2$ are hydrogen, alkali metal or an equivalent of a polyvalent metal ion such as zinc, calcium or ammonium, an alicyclic polyamine, or a heterocyclic amine radical; and this invention relates to the process for the production of such compounds.

The compounds of my invention, in their acid form, may be considered inner salts. Thus, for example, and without limitation of my invention, the following illustrates the nature of the inner salts:

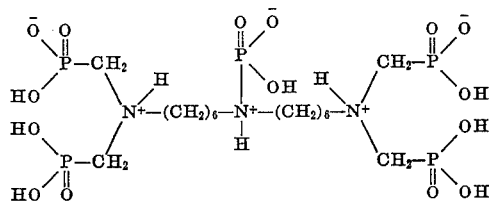

There are thus available seven equivalents of acidic hydrogen. In like manner, salts of the compounds of my invention will also be analogous inner salts in which the salt-forming cations will neutralize acid hydrogens not so internally neutralized, as will be understood by those skilled in this art.

The acid forms of surface-active polyalkylene polyamino polykis methylene phosphonic acids have an average molecular weight in the range of about 600 to about 2,000, , as determined by Thermonam analysis (ASTM Part 17 Method D2502). The preferred molecular weight of the acid form is in the range of about 600 to 800.

As will be shown below, the compounds of my invention are chelating agents.

Characteristic of the compounds which are suitable as aforesaid are the polyalkylene polyamino polykis methylene phosphonic acids and their salts, in which the methylene phosphonic acid radicals are at least equal in number to the amino hydrogens of the alkylene amine radicals of the compounds of my invention. That is, all of the amine radicals of the polyalkylene polyamine radicals have been substituted by methylene phosphonic acid radicals and are thus substantially free of secondary and primary amine hydrogens.

The following are some examples conformable with the compounds of my invention, and which are useful in the process of my invention described herein:

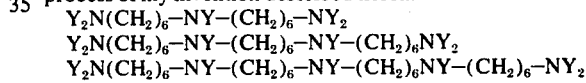
$Y_2N(CH_2)_6-NY-(CH_2)_6-NY-(CH_2)_6NY_2$
$Y_2N(CH_2)_6-NY-(CH_2)_6-NY-(CH_2)_6NY-(CH_2)_6-NY_2$
$Y_2N(CH_2)_2-(CH_2)_6-NY_2$
$Y_2N(CH_2)_6-NY-(CH_2)_2-NY-(CH_2)_6NY_2$ and the alkali metal, alkaline earth and other polyvalent cation salts, the amino and substituted amino, primary and secondary amine salts of the foregoing.

Compounds as described above, which contain one or more equivalents of labile hydrogen per average molecular weight of the compound, are in their acid form ineffective as scale inhibitors, even though they may otherwise have the molecular weight, nitrogen content and phosphonic acid, content to conform to the aforementioned formulas.

I have found that the presence of substantial amounts of the compound containing unsubstituted nitrogens, so as to leave a labile hydrogen associated with any of the nitrogens of the amine radical, produces compounds which, in dilute solutions, such as are used in commercial treatment of water for scale inhibition, cause precipitation of a portion of the compounds. Such compounds, at concentrations of about 5 percent by weight of the compound in water, a concentration frequently used in oil well operations, are unsuitable for oil field use.

I therefore desire that the polyalkylene polyamino polykis methylene phosphonic acids or the salts thereof, for use as scale preventers or corrosion inhibitors, be substantially free of such phosphonic acids or salts thereof containing trivalent amino nitrogens in which all of the valences are not satisfied by methylene phosphonic acid radicals, herein referred to as the incompletely substituted analogue of the aforesaid completely substituted analogue. Thus, for example, it is desirable to exclude substantial quantities of the aforesaid analogous compounds wherein not all of the secondary and primary amine valences are satisfied by a Y radical.

A satisfactory test for determining the presence of an excessive proportion of the unsubstituted compounds, which are desired to be excluded from the subject matter of this invention, is to dissolve about 5 percent by weight of the compound in water. Any turbidity of the water sufficient to precipitate about 0.2 percent of the compound, i.e., more than about 0.4 percent by weight of the added compound, indicates an excessive amount of the unsubstituted product. Compounds which at such concentrations do not show the aforesaid turbidity are herein referred to as soluble in water.

For use in treatment of oil wells, water wells and gas wells, I prefer compounds which do not contain the unsubstituted amine hydrogens as aforesaid, as well as compounds which are soluble as aforesaid.

In order to prevent the formation of the incompletely substituted polyalkylene polyamino polykis methylene phosphonic acid, I have found it preferable that there be at least one phosphonic acid molecule present for each labile hydrogen in the primary and secondary amine radicals in the polyamine reactant, in the reaction mixture used to produce the resultant compound, when the reactants are condensed through the formaldehyde reaction described below.

The FIGURE of the drawing illustrates in schematic form the apparatus referred to in the following description.

The preferred process for the formation of compounds of my invention is carried out by feeding phosphorous trichloride through 3 and sparger 3b directly into a body of water in a vessel 1, while stirring vigorously with motorized stirrer 8'. The vessel is equipped with a heating jacket 2, a cooling coil 2a, and a reflux condenser 4, which is connected to a trap 5, provided with a liquid return line 6, and to a hydrochloric acid scrubbing system 8 through line 7.

The vessel is filled with the required amount of water, and phosphorous trichloride is introduced directly into the body of water to form hydrochloric acid and phosphonic acid.

I have found it preferable to introduce the $PCl_3$ directly into the body of water and to stir vigorously during the reaction. I also prefer to control the addition rate of the phosphorous trichloride slowly into the body of water by feeding the phosphorous trichloride underneath the body of water through the feeder pipe 3. The rate of addition must be controlled to prevent the generation of orange phosphorous and phosphene gas.

It has been found desirable that the rate of addition, when about three-quarters of the required amount of phosphorous trichloride has been added, shall be carefully monitored and introduced slowly, in order to avoid such undesirable side reactions.

A further undesirable consequence of an improper addition of the phosphorous trichloride is the distillation of hydrochloric acid which passes through the condenser and into the hydrochloric acid tower and carries phosphonic acid with it.

When all of the phosphorous trichloride has been added, and this occurs at ambient temperature, the temperature of the batch rises due to reaction exotherm, cooling is applied to hold the temperature to about 200° to 220° F., and time is allowed to complete the reaction of the $PCl_3$ with water to produce the phosphonic acid. It is important that constant rapid agitation be maintained during the period of addition and the subsequent high-temperature reaction stage.

By following this precaution, I find that I avoid the production of incompletely substituted compounds.

When the phosphorous trichloride has reacted, the requisite amount of polyamine is introduced into the body of the reaction mixture in the vessel 1 through 3a. The amount of amine which is added should be at least equal to a molar ratio of 1 mole of $PCl_3$, or the equivalent phosphonic acid $HPO(OH)_2$, for each equivalent of labile amino hydrogen in the polyalkylene polyamine employed in the reaction. When dihexylene triamine is employed, it is desirable to have at least 1 mole of amine to 5 moles of $PCl_3$ and preferably to avoid any excess of the amine. It is desirable to have a molar excess of $PCl_3$, for example, of 5 PERCENT TO 15 percent.

The temperature of addition of the amine is about 100° to about 120° F., and therefore the reaction mixture of the phosphonic acid should be cooled from the temperature of 200° to 230° F. down to about 100° to 120° F.

After all of the amine has been added, the temperature is raised to about 200° to 220° F., and an aqueous solution of formaldehyde is added through the sparger 3a. The formaldehyde rate of addition must be controlled so that the temperature does not rise excessively, since the reaction is exothermic. The rate is controlled by the cooling coil so as to produce a steady reflux.

The molar amounts of formaldehyde which are added shall be at least equal to the molar quantities of $PCl_3$ which are used, and preferably somewhat in excess, for example, 10 percent to 20 percent molar excess.

When all of the formaldehyde is added, the vessel, which is at a temperature of about 200° to 220° F., is held for several hours to complete the reaction and is then cooled to about 150° F. Assuming the reaction with the dihexylene triamine, the reaction scheme is about as follows:

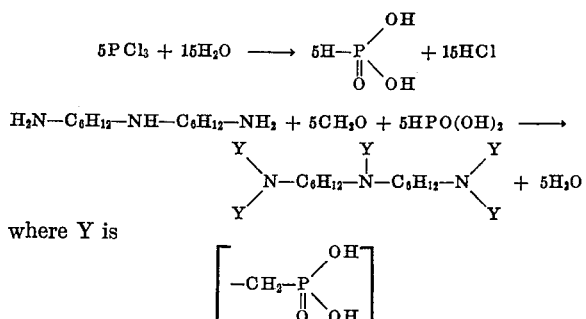

where Y is

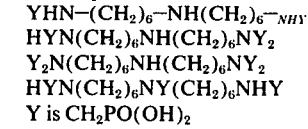

By employing the mixing technique described above, I may avoid the formation of substantial quantities of compounds other than the polyalkylene polyamino polykis methylene phosphonic compounds of my invention in which all of the primary amino hydrogens of the polyamine precursor have been substituted by methylene phosphonic acid radicals.

In the case of example 1, I have found, for example, where inadequate mixing occurs, resulting in part from the introduction of the $PCl_3$ through the top of the reactor, a substantial quantity of incompletely substituted compounds is produced. For example:

YHN—(CH$_2$)$_6$—NH(CH$_2$)$_6$—$_{NHY}$
HYN(CH$_2$)$_6$NH(CH$_2$)$_6$NY$_2$
Y$_2$N(CH$_2$)$_6$NH(CH$_2$)$_6$NY$_2$
HYN(CH$_2$)$_6$NY(CH$_2$)$_6$NHY
Y is CH$_2$PO(OH)$_2$

Compounds produced by the above variant of the preferred process did not possess the solubility to the extent stated above, i.e., are not classified as soluble compounds.

The produce produced is a water solution of the polyalkylene polyamino polykis methylene phosphonic acids, which may be contaminated by halogen compounds resulting from the residual chloride ions derived from the $PCl_3$ employed in the reaction.

The solution is normally at a pH of about 2 to 4. This solution may be used in that form in the processes of scale inhibition, corrosion protection, and chelation in oil well treatment described herein. However, the polykis acid may be isolated from the solution by the following procedure.

The solution is concentrated, preferably at a moderate temperature, for example, under vacuum at a temperature less than 212° F., to a concentration such that the solution is fluid at ambient temperatures. For example, such a solution will have a concentration of about 70 percent to 80 percent by weight of the polykis acid.

A solution of alkali metal hydroxide, for example, sodium hydroxide or potassium hydroxide, is added to adjust the pH to about 9 to 10. The chloride ions present in the solution are converted to potassium chloride or sodium chloride by the alkali metal hydroxide. The alkali metal chlorides will precipitate when the mixture is at ambient temperature, e.g. in the range of about 60° to 80° F., and the free liquor may be decanted or removed by filtration.

The solution of the polykis acid may be further concentrated and dried under vacuum, for example, 28 inches or 30 inches of vacuum. The resultant polykis acid is in the form of the alkali metal salt.

An alternative procedure is to concentrate the reaction mixture as above and, instead of neutralizing, I may add to one volume of the solution about 2 to 4 volumes of a lower alkyl alcohol of, for example, one to three carbon atoms, e.g., methanol, ethanol, or isopropyl alcohol, in an amount sufficient to precipitate the polykis acid substantially free of chloride ions.

The precipitate may be separated by decantation or filtration and the precipitate washed with the above alcohols to further purify the polykis acid by removing the contaminating halogen compounds.

Thus, for example, the compounds of my invention set forth in the herein tables and the salts thereof will have solubilities to the degree set forth herein.

The following is an example of a preferred preparation using dihexylene amine, which will produce a dihexylene triamino pentakis methylene phosphonic acid, which is a preferred compound for use in the process of my invention.

EXAMPLE 1

Vessel 1 is filled with 8,700 pounds of soft water. The stirrer is started. Refrigerated water is passed through the cooling coil. Addition of $PCl_3$ is started through 3 and the sparger, slowly at a steady rate of about 100 gallons per hour. The rate of addition is moderated, and cooling is applied in order to prevent the carryover of liquid through the reflux condenser.

When about 5,000 pounds of $PCl_3$ have been added, the rate of addition of the $PCl_3$ is reduced to about 20 gallons per hour, until a total of 6,060 pounds has been added.

When all of the $PCl_3$ has been added (and this will take about 5 hours), any condensate in trap 5 is returned to the vessel 1. The temperature of the vessel is then raised to about 220° F. and is held for about 6 hours to complete the reaction of $PCl_3$ and to produce the phosphonic acid.

The liquid contains a mixture of phosphorous acid and hydrochloric acid. Nitrogen is blown through the mixture at a rate of 2 to 4 cubic feet per minute at 200° to 210° F., until most of the hydrochloric acid is displaced. This may take about 2 hours. The chloride ion content in the mixture is determined by a standard chemical analysis. Residual chloride ion as HCl is typically 1.5 percent to 3 percent.

Alternatively, vacuum can be used to remove the excess of hydrogen chloride, or both nitrogen purge and vacuum can be used.

The mixture of phosphonic acid, hydrochloric acid and water in the vessel 1 is cooled to about 120° F., and 2,200 pounds of dihexylene triamine is added in a steady stream to the body of the vessel 1. The amine is a commercial product as described hereinafter.

When all of the dihexylene triamine is added, the temperature is raised to about 215° F., and 4,000 pounds of 37 percent aqueous formaldehyde is added through the sparger. The formaldehyde rate of addition must be controlled so that the temperature does not rise excessively, since the reaction is exothermic. The rate is controlled so as to produce a steady reflux.

When all of the formaldehyde is added (this usually takes about 5 hours), the vessel is heated to 200°-210° F., and the mixture is held for about 6 hours to complete the reaction and then cooled to 150° F. and discharged.

For simplicity, the pure amine is included in the above reaction scheme. It will be understood, however, that the other polyamine fractions will react according to the above scheme, adjusting the molar ratios to provide for an excess of $PCl_3$ and consequent excess of phosphonic acid above the stoichiometric ratios.

The above example will produce about 16,500 pounds of triamino dihexylene pentakis phosphonic acids, containing some tetramino trihexylene hexakis methylene phosphonic acid, substantially free of any phosphonic acid derivatives containing an amine hydrogen associated with an amine nitrogen, unsubstituted by the methylene phosphonic acid radical.

It will be recognized that, because of the presence of hydrochloric acid in the mixture when the amine is added, it will enter the reaction as the hydrochloric acid salt; and the reaction therefore occurs with the salt of the amine.

As explained above, the reaction mixture is a water solution of the polykis acid and halogen compounds. I may isolate the polykis acid in the manner described above.

The solution as produced in example 1 will run about 45 percent by weight of the polykis acid and contains some chloride ions. The pH of the solution is about 2. The withdrawn solution is vacuum distilled at a temperature of about 180° to 200° F., to concentrate the solution to about 70 percent to 80 percent by weight of the polykis acid. The solution is cooled to ambient temperature, for example 60° to 80° F., and brought to a pH of about 9 to 10 by sodium hydroxide or potassium hydroxide, employed at a concentration so as not to cause excessive dilution, for example, keeping the concentration of the polykis acid to about 65 percent to 70 percent by weight.

The KCl and NaCl which are formed will crystallize from the solution, and the potassium or sodium chloride may be separated from the potassium or sodium salts of the polykis acid, which would be in the mother liquor, by decantation or filtration. The mother liquor may be concentrated under vacuum and the polykis acid dried under vacuum, keeping the temperature below about 212° F.

If the free acid is desired to be separated, I may proceed in the manner described above by acidifying the salt with, for example, hydrochloric acid, and removing the alkali metal hydrochloride salt by crystallization and drying the acid under vacuum in the manner described above.

An alternative procedure is to treat the reaction mixture produced in vessel 1 with alcohol in the manner previously described, and isolate the polykis acid as described above. The resultant acid will be substantially pure.

Because of its availability and cost, I prefer to employ the commercial product composed of about 3 mols $Y_2N(C_6H_{12})NY.C_6H_{122}$ to about 1 mol $Y_2N(C_6H_{12})NYC_6H_{12}NYC_6H_{12}NY_2$. Where the compound

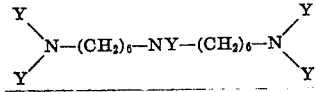

is referred to herein, it will be understood that it may contain the polymeric forms derived from the polyamines of higher polymeric forms referred to above.

In example 1, the amine was composed of the triamine and the tetramine as aforesaid.

The compounds of this invention possess surfactant properties in aqueous solutions. The data and comparisons with other amino methylene phosphoric acids are shown in terms of surface tension reduction in water in table I.

TABLE I.—SURFACE TENSION OF POLYMERIC ALKYL PHOSPHONIC ACIDS SOLUTIONS IN DYNES/SQ. CM.

[Tensiometer: DuNoüy Tensiometer—6 mm. platinum ring; Y in the structures below equals to $-CH_2-PO(OH)_2$]

| Scale inhibitors | Concentration percent by weight in distilled water | | |
|---|---|---|---|
| | 0.1 | 0.01 | 0.001 |
| (1) $Y_2-N-(CH_2)_6-N(Y)-(CH_2)_6-N-Y_2$ | 48 | 52 | 62 |
| (2) $Y_2-N-(CH_2)_6-N(Y)-(CH_2)_6-N(Y)-(CH_2)_6-N-Y_2$ | 50 | 54 | 60 |
| (3) Potassium salt of $Y_2-N-(CH_2)_6-N(Y)-(CH_2)_6-N-Y_2$ | 52 | 56 | 61 |
| (4) $Y_2-N-(CH_2)_3-N(Y)-(CH_2)_2-N-Y_2$ | 72 | 72 | 72 |
| (5) $Y_2-N-(CH_2)_3-N(Y)-(CH_2)_3-N-Y_2$ | 69 | 70 | 71 |
| (6) Potassium salt of $N-Y_3$ | 72 | 71 | 73 |
| (7) [pyridine-like ring with $-N-Y_2$ and $-N-Y_2$] | 71 | 71 | 72 |
| (8) $Y_2-N-(CH_2)_6-N-Y_2$ | 70 | 70 | 72 |
| (9) Surface tension of distilled water | 72 | 72 | 72 |

It was found that compounds which produce the surface tension reduction are outstanding scale inhibitors under dynamic conditions encountered in the field.

Comparing compounds (1)–(3) of my invention with (4)–(AY) and also with distilled water (9), it will be seen that the compounds of my invention are excellent surface active agents, while compounds (4)-(8) are essentially inactive. This illustrates the effect of the presence of the polymeric amine radical and the advantage of the presence of the hexylene radical in the polymeric amine radical.

The following data illustrate the effectiveness of the compounds of my invention in inhibiting the crystallization of calcium sulfate and their effect upon the degree of scale protection.

Laboratory Test

A dynamic test of calcium sulfate crystallization in an agitated system was developed to examine the performance of various additives. The test is carried out as follows:

Solutions

A. 5 percent Sodium chloride in distilled water.
B. 3 percent Calcium chloride in solution A.
C. 3 percent Sodium sulfate in solution A.

Procedure

Introduce the tested additive in the desired concentration into 50 ml. of solution B in a 250 ml. beaker.

Place 50 ml. of solution C into another 250 ml. beaker.

Place both beakers on a hot plate and agitate.

When temperature of the liquid in the beakers has reached 140° F., pour solution B into solution C and continue to agitate for 5 minutes at 140° F.

Transfer quantitatively the contents from the test beaker into a 100 ml. calibrated centrifuge tube and allow to digest for one-half hour.

Centrifuge the scale for 10 minutes at a medium speed.

Read and record the volume of scale. Run a blank employing the same conditions but without the addition of the inhibitor.

The results of this test are summarized in table II.

Analogous compounds (5), (6) and (7), containing unsubstituted amino nitrogens, showed no scale inhibition by the above test.

Comparing the compounds of my invention (1)-(4) with compounds (5)-(9), it will be observed that the compounds of my invention are much superior. It required 10 times as much of the cyclohexylene diamino tetrakis phosphonic acid to obtain incomplete protection, while the compounds of my invention, at the lower concentrations, gave substantially complete protection.

While the ethylene diamino tetrakis phosphonic acid required conversion to the sodium salt form to be at all soluble and could not be dissolved in the acid form, it was substantially inactive. It required more than 100 times the concentration to get incomplete protection. The incompletely substituted analogues were inactive.

The result of this inhibition is the retention of the salts in solution. This is illustrated by the following data.

By inhibiting crystallization, the additives raise the concentration of $CaSO_4$ and $CaCO_3$ in solution. Results in a static test employing various concentrations of the scaling compounds in excess of their solubility limits, at various temperatures, are shown in table III.

To the solutions of salts at the concentrations indicated in the table, the compounds were added in the indicated concentrations. The mixtures were allowed to stand at the indicated temperatures for the stated periods. The titration of calcium ions was performed by the Schwarzenbach method, utilizing the ethylene diamino tetracetic acid as a titrant.

Comparing the compounds of my invention (1) and (2) with compounds (3) and (4), it will be seen that the compounds of my invention give a substantially greater degree of scale inhibition at less than a quarter of the concentration

TABLE II.—SCALE INHIBITION OF VARIOUS POLYMERIC PHOSPHONATES

[Conditions: Temperature—140° F.; Concentration—$Ca^{++}$ 5,000 p.p.m.; $SO_4$ 10,000 p.p.m.; NaCl 5%. Y in the structures below equals to $-CH_2-PO(OH)_2$]

| Compound | Concentration, p.p.m. of compound | Scale[1] protection, percent |
|---|---|---|
| (1) $Y_2-N-(CH_2)_6-N(Y)-(CH_2)_6-N-Y_2$ | 3<br>6 | 20<br>99+ |
| (2) Potassium salt of $Y_2-N-(CH_2)_6-N(Y)-(CH_2)_6-N-Y_2$ | 3<br>6<br>9 | 10<br>70<br>99+ |
| (3) Morpholine salt of $Y_2-(CH_2)_6-N(Y)-(CH_2)_6-N-Y_2$ | 3<br>6<br>9<br>12 | 2<br>30<br>60<br>99+ |
| (4) $Y_2-N-(CH_2)_6-N(Y)-(CH_2)_6-N(Y)-(CH_2)_6-N(Y)-(CH_2)_6-N-Y_2$ (10%); $Y_2-N-(CH_2)_6-N(Y)-(CH_2)_6-N(Y)-(CH_2)_6-N-Y_2$ (90%). | 3<br>6<br>9<br>12<br>15 | 0<br>25<br>50<br>75<br>99+ |
| (5) $YNH-(CH_2)_6-NH-(CH_2)_6-NHY$ | 100<br>500<br>1,000 | 0<br>0<br>0 |
| (6) $YNH-(CH_2)_6-NY-(CH_2)_6-NHY$ | 100<br>500<br>1,000 | 0<br>0<br>0 |
| (7) $Y_2-N-(CH_2)_6-NH-(CH_2)_6-NY_2$ | 100<br>500<br>1,000 | 0<br>0<br>0 |
| (8) cyclohexane with $-N-Y_2$ and $-N-Y_2$ substituents | 30<br>60<br>90<br>120 | 0<br>0<br>40<br>80 |
| (9) $Y_2-N-C_2H_4-N-Y_2$ [2] | 50<br>100<br>250<br>500<br>1,200 | 0<br>10<br>80<br>90<br>95 |

[1] The percent scale protection is determined by dividing the difference between the volume of the scale deposited using the inhibitor and the volume of the scale produced in the blank, as the numerator, by the volume of the scale produced in the blank as the denominator, multiplied by 100.

[2] In the form of the sodium salt. The acid form not neutralized by sodium was insoluble in distilled water. Only 20 parts per million could be introduced into solution.

TABLE III.—CONCENTRATION OF PRECIPITATING SALTS—CaSO₄ AND CaCO₃—IN SOLUTIONS CONTAINING SCALE INHIBITORS

| Additive | Conc. p.p.m. inhibitor | Hardness, p.p.m. CaSO₄ | Temp., °F. | P.p.m. CaSO₄ after 24 hrs. | Hardness, p.p.m. CaCO₃ | P.p.m. CaCO₃ after 24 hrs. |
|---|---|---|---|---|---|---|
| Blank | None | 15,000 | 75 | 3,600 | 225 | 30 |
| (1) Y₂N(CH₂)₆N(Y)(CH₂)₆NY₂ | 1.2 | 15,000 | 75 | 5,160 | | |
|  | 2.4 | 15,000 | 75 | 10,300 | 225 | 225 |
|  | 4.8 | 15,000 | 75 | 15,000 | 225 | 225 |
| (2) Y₂N[(CH₂)₆N(Y)]₂(CH₂)₆NY₂ | 1.2 | 15,000 | 75 | 4,900 | 225 | 225 |
|  | 2.4 | 15,000 | 75 | 9,150 | 225 | 225 |
|  | 4.8 | 15,000 | 75 | 14,900 | 225 | 225 |
| (3) Y₂N(CH₂)₂N(Y)(CH₂)₂NY₂ | 1.2 | 15,000 | 75 | 3,900 | | |
|  | 2.4 | 15,000 | 75 | 4,200 | | |
|  | 4.8 | 15,000 | 75 | 5,050 | 225 | 205 |
|  | 10.0 | 15,000 | 75 | 7,310 | 225 | 190 |
|  | 20.0 | 15,000 | 75 | 13,800 | 225 | 182 |
| (4) NY₃ | 4.8 | 15,000 | 75 | 4,300 | 225 | 170 |
|  | 10.0 | 15,000 | 75 | 6,520 | 225 | 170 |
|  | 20.0 | 15,000 | 75 | 11,810 | 225 | 176 |
| Blank | None | 10,000 | 140 | 3,000 | 225 | 15 |
| (1) Y₂N(CH₂)₆N(Y)(CH₂)₆NY₂ | 1.2 | 10,000 | 140 | 4,400 | 225 | 225 |
|  | 2.4 | 10,000 | 140 | 8,150 | 225 | 210 |
|  | 4.8 | 10,000 | 140 | 9,980 | 225 | 210 |
| (2) Y₂N[(CH₂)₆N(Y)]₂(CH₂)₆NY₂ | 1.2 | 10,000 | 140 | 4,100 | 225 | 130 |
|  | 2.4 | 10,000 | 140 | 7,920 | 225 | 150 |
|  | 4.8 | 10,000 | 140 | 10,000 | 225 | 210 |
| (3) Y₂N(CH₂)₂NH(CH₂)₂NH(CH₂)₂NY₂ | 4.8 | 10,000 | 140 | 3,800 | 225 | 180 |
|  | 10.0 | 10,000 | 140 | 5,750 | 225 | 180 |
|  | 20.0 | 10,000 | 140 | 9,200 | 225 | 178 |
| (4) NY₃ | 4.8 | 10,000 | 140 | 3,100 | 225 | 160 |
|  | 10.0 | 10,000 | 140 | 3,500 | 225 | 130 |
|  | 20.0 | 10,000 | 140 | 7,300 | 225 | 120 |
| Blank | None | 7,500 | 185 | 2,300 | 225 | 40 |
| (1) Y₂N[(CH₂)₆NY]₂(CH₂)₆NY₂ | 1.2 | 7,500 | 185 | 3,318 | 225 | 180 |
|  | 2.4 | 7,500 | 185 | 6,200 | 225 | 170 |
|  | 4.8 | 7,500 | 185 | 7,486 | 225 | 160 |
| (2) Y₂N(CH₂)₆N(Y)(CH₂)₆NY₂ | 1.2 | 7,500 | 185 | 3,020 | 225 | 180 |
|  | 2.4 | 7,500 | 185 | 5,750 | 225 | 180 |
|  | 4.8 | 7,500 | 185 | 7,500 | 225 | 190 |
| (3) NY₃ | 4.8 | 7,500 | 185 | 2,800 | 225 | 90 |
|  | 10.0 | 7,500 | 185 | 3,100 | 225 | 90 |
|  | 20.0 | 7,500 | 185 | 4,600 | 225 | 100 | required from compounds (3) and (4) for inferior scale inhibition.

Surface-active polymeric alkyl phosphonic acids were tested as corrosion inhibitors in sour waters containing 100,000 ppm. sodium chloride and 0.5 ml. of acetic acid per liter; test solutions were saturated with hydrogen sulfide and tested according to the "Wheel test" described by AC Nestle, "Simulated Field Usage Testing Organic Inhibitors for Oil and Gas Wells," Materials Protection, Vol. 7, page 31, Jan. 1968.

It will be seen that, whereas products (3) and (4) have no corrosion inhibition properties, the compounds of my invention have substantial corrosion protection properties.

The results are shown in table IV.

TABLE IV.—CORROSION INHIBITION BY POLYMERIC ALKYL PHOSPHONIC ACIDS AND THEIR DERIVATIVES

| Compound | Conc., p.p.m. | Coupon weight loss, mg. | Percent protection |
|---|---|---|---|
| (1) Y₂N(CH₂)₆NH(CH₂)₆NY₂ | 10 | 17.3 | 75. |
|  | 20 | 12.5 | 82. |
| (2) Y₂N[(CH₂)₆NY]₂(CH₂)₆NY₂ | 10 | 13.9 | 80. |
|  | 20 | 11.9 | 83. |
| (3) Y₂N(CH₂)₃NY(CH₂)₃NY₂ | 10 | 72.8 | Nil. |
|  | 20 | 74.0 | None. |
|  | 50 | 76.3 | Do. |
| (4) NY₃ | 10 | 77.1 | Nil. |
|  | 20 | 76.2 | None. |
|  | 50 | 81.0 | Corrosive. |
| Blank |  | 71.4 |  |
|  |  | 68.8 |  |
|  |  | 69.5 |  |

All tests were run for 24 hours at room temperature, 70° F.

Percent protection is determined as the ratio of the difference between the coupon weight loss with the blank and the coupon weight loss using the inhibitor, divided by the coupon weight loss of the blank, multiplied by 100.

Polyalkylene polyamino polykis methylene phosphonic acids of this invention show excellent compatibility with cationic surface-active amines.

The resulting salts are corrosion inhibitors, as shown in table V.

TABLE V.—PERFORMANCE OF POLYMERIC ALKYL PHOSPHONIC ACID AMINE SALTS AS CORROSION INHIBITORS

| Compound | Concentration, p.p.m. | Percent protection |
|---|---|---|
| The following salts of the acid formed according to Example 1: | | |
| $C_{17}H_{35}CON\langle\rangle NC_2H_4NH_2$ | 12 | 83 |
|  | 25 | 86 |
| $C_{17}H_{33}C\begin{array}{c}N-CH_2\\N-CH_2\\C_2H_4NH_2\end{array}$ | 12 | 80 |
|  | 25 | 97 |
|  | 50 | 99 |
| $C_{17}H_{35}CONHC_2H_4NHC_2H_4NH_2$ | 12 | 83 |
|  | 25 | 93 |
|  | 50 | 99 |
| Salt containing excess of acid—2 equivalents of acid per 1 equivalent of amine: | | |
| $O\langle\rangle NC_2H_4OC_2H_4N\langle\rangle O$ | 12 | 78 |
|  | 25 | 80 |
|  | 50 | 99 |

Corrosion tests were run in sour brine 24 hours at room temperature (70° F.), in the presence of constant inhibitor concentration, by the "Wheel test" procedure referred to previously.

Polymeric polyalkylene polyamino polykis methylene phosphonic acids of this invention exhibit chelating properties and show excellent dispersant properties for iron. Tests for dispersing power and chelation were run visually by titration of an inhibitor solution (500 ppm.) at constant pH with a 4 percent solution of ferric chloride to an end point of permanent turbidity after 10 hours standing. Results are shown in table VI.

TABLE VI.—CHELATION AND DISPERSION OF IRON BY POLYMERIC ALKYLENE POLYAMINO POLYKIS METHYLENE PHOSPHONATES

| Compound | pH | Ml. of 4% FeCl₃ added to 200 ml. 0.05% solution of additive to achieve permanent turbidity | Pounds of Fe chelated by 100 pounds of additive |
|---|---|---|---|
| $Y_2N(CH_2)_6NY(CH_2)_6NY_2$ | 6 | 1.6 | 13 |
|  | 8 | 2.1 | 17 |
|  | 10 | 8.9 | 74 |
| $Y_2N[(CH_2)_6NY]_2(CH_2)_6NY_2$ | 6 | 1.3 | 11 |
|  | 8 | 1.3 | 11 |
|  | 10 | 6.9 | 57 |
| $Y_2N(CH_2)_2NY(CH_2)_2NY_2$ | 6 | 1.1 | 9 |
|  | 8 | 3.4 | 28 |
|  | 10 | 5.7 | 47 |
| $NY_3$ | 6 | 1.7 | 14 |
|  | 8 | 2.7 | 17 |
|  | 10 | 12.6 | 104 |

The chelating and dispersing properties of polymeric alkyl phosphonic acids are very important in the boiler treatment, in pipe lines, and in the oil field. Additives with chelating properties remove existing deposits and contribute to cleanliness of the system.

In using the compounds of my invention as scale inhibitors, advantage is taken of the solubility produce of the calcium salt of the polyalkylene polyamino polykis methylene phosphonic acid employed, at the pH of the involved water.

Thus, for example, employing the compounds formed according to example 1, the amount of the polyalkylene polyamine polykis methylene phosphonic acid required to prevent deposition of calcium sulfate or the calcium salt of the above polyalkylene polyamine polykis methylene phosphonic acid at various pH's is as follows in table VII.

The following table gives the concentrations of the above pentakis methylene phosphonic acid which will hold calcium sulfate and calcium salt of the above acid in solution at the indicated pH. The test was conducted at ambient temperature in water containing 5,000 parts per million of Ca ions and 10,000 parts per million sulfate ions at 140° F.

TABLE VII

| pH: | Weight parts per million of compound |
|---|---|
| 10 | 30–70 |
| 8 | 15–120 |
| 6 | 15–120 |
| 4 | 3–300 |

If the concentration at the various pH values is exceeded, the calcium salt of the polykis acid precipitates. If the concentration is less than the lower limit, calcium sulfate is precipitated.

In carrying out the process of scale inhibition in systems such as water lines and pumps, boilers and hot water heaters, depending on the pH of the water and temperature encountered, I add a concentrated solution of the polyalkylene polyamino polykis methylene phosphonic acid to introduce into the water an amount of the acid which will, according to the static test described in connection with table III, produce substantially no precipitation, as indicated by the substantial equality of the Ca ion content of the sample before and after treatment in said test.

For example, for waters of pH 6 to 8, a useful concentration of the compound to be established in the water shall be from about 2 to about 200 parts by weight per million of the polyalkylene polyamino polykis methylene phosphonic acid.

The introduction may be made into the circulating water by conventional methods.

In carrying out corrosion protection of ferrous structures in contact with waters, I may make a preliminary test, as described in connection with table IV, to determine the concentration of the compound to give the desired protection. However, suitable protection will be found to be attained in normal water media when employing the compounds at the concentrations set forth above, i.e., 2 to 200 parts by weight per million.

By measuring the pH of the water treated, the addition rate of the polyalkylene polyamino polykis phosphonic acid employed can be adjusted to inhibit scale formation in water lines, boilers and other systems in which scale is desired to be inhibited.

In addition to the inhibition of scale, the compounds will also act as corrosion inhibitors, as described above.

An additional advantage is obtained by employing salts of the acids of my invention, particularly the salts shown in table V.

Particularly useful compounds are salts formed from a mixture of the following substituted morpholine compounds in the approximate mixture as follows:

(A) bis-2-(4 morpholinyl) ethyl ether, about 60%:

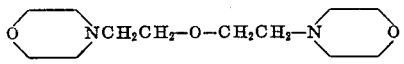

(B) 4(2-aminoethoxy) ethyl morpholine, about 25%:

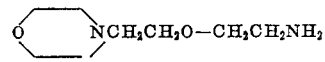

(C) 2 (4-morpholinyl ethoxy) ethanol, about 15%:

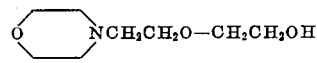

Such salts are particularly useful in ranges of temperature of 80°–200° C. for water treatment.

Other useful salts include salts of the alkyl amido polyalkylene amines, $RCOONHR_1NH-R_2NH_2$, wherein R is an alkyl chain of $C_5$ to $C_{17}$ carbon atoms and $R_1$ and $R_2$ are alkyl radicals of 2 to 6 carbon atoms. For example, salts of:

(D) $\quad C_{17}H_{35}\underset{\underset{O}{\|}}{C}-ONHC_2H_4NH-C_2H_4NH_2$

The compounds of my invention are also useful in the treatment of waters used in water drives and other secondary recovery methods, to inhibit scale formation in the formations, the well, lines and equipment used in connection therewith. Particularly useful and preferred for that purpose are the substituted morpholine salts referred to above. For example, I may employ about 0.5 to 2 pounds of the compounds of my invention per 100 barrels of water treated.

In many cases it is desirable to inhibit corrosion in lines of producing oil wells where also the water cut of the oil is sufficiently high so that scale deposition is a factor. In such cases, I proceed by the squeeze method to introduce either an oil-soluble form or a water-soluble form of the compounds of my invention, in their calcium salt form, into the formation. Usually about 100 to about 1,000 pounds of the scale inhibitor of my invention are introduced into the formation.

Suitable compounds of the oil-soluble form are the amine salts, the amine cation of which is an amine such as, for example, the salt of the amine, item (D) supra, and the acid of example 1.

For example, I may employ 200 pounds of salt from (D), which is mixed with 200 parts of ethyl alcohol and the mixture diluted 3 to 1 with an aromatic solvent such as toluene. To this mixture is added a nonionic surfactant, such as an alcohol polyethoxylate or a polyethoxylated fatty acid, or other conventional nonionic surfactant. Alternative to the ethyl alcohol I may use isopropyl alcohol, and instead of toluene I may use benzene or xylene or mixtures thereof. The purpose is to produce a common solvent for the compound and the oil.

For example, I may introduce into the well flow tube, which has been drawn down, 110 gallons of the above solution of the salt of compound D, and then follow with 100 barrels of the oil produced from the well. Pressure is applied to the oil to force the solution into the formation.

These figures are merely illustrative, and the amounts will depend on the permeability of the formation and the volume of the liner in the well, as will be understood by those skilled in this art.

This procedure may usefully be repeated periodically at intervals of about 3 to 12 months. The level of the concentration of the compound in the production stream is monitored by determining the concentration of inhibitor by oxidizing the polyphosphonic compound to orthophosphate with sulfuric acid and potassium permanganate or other suitable oxidizing agents such as perchlorate or hypochlorous acid. The phosphate is determined, for example, colorimetrically, as the phosphomolybdate complex, compared with a standard phosphate solution. The equivalent amount of the salt of D present in the sample can be determined by a simple stoichiometric calculation.

The concentration of the salt of compound D of 10 parts per million or higher is deemed a safe level. When the content drops to as low as 5 parts per million, it is desirable to repeat the above treatment.

A particularly useful reservoir treatment to prevent scale deposition is to employ the water-soluble partial calcium salt of the phosphonic acids of my invention, for example, the alkaline earth inner salt of the polyalkylene amino pentakis phosphonic acid, as stated above, in which each of the amine nitrogens is associated with one of the protons of the acid hydroxyl groups of the phosphonic acids. Preferably a substantial portion of the remaining acid groups is neutralized with calcium, for example:

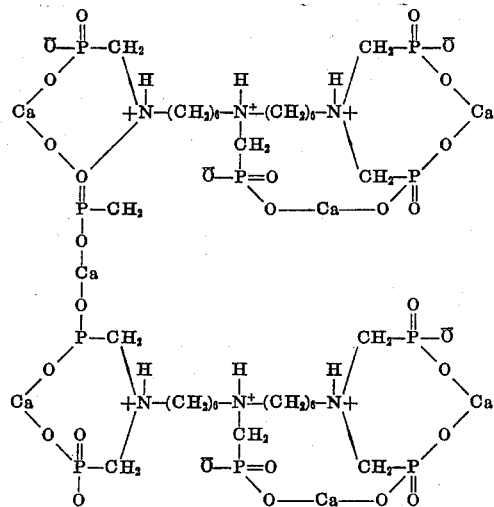

In practice, the treatment is performed with chemically neutral (pH 6 to 7.5) solutions of the partial calcium salt containing typically from about 1.5 to about 2.5 mols of calcium per mol of the polyalkylene polyamino polykis methylene phosphonic acid.

Where the polykis phosphonic acids are made from mixtures of the polyalkylene amines, as in the case of example 1, the calcium neutralized acid will be a mixture of the calcium salts of the various acids, as will be understood by those skilled in this art.

Further, like salts of the other polyalkylene polyamino polykis phosphonic acids described above may be used.

This treatment will inhibit the deposition of scale in the formation at the locus of the well surface. Due to the pressure and temperature gradient through which the formation fluids pass, in cases where the oil is mixed with water, scale deposition at the well locus is encountered. The scale deposits increase the flow resistance and reduce the rate of flow, i.e., the well production rate.

It is the purpose of the well treatment of my invention to deposit in the formation adjacent to the well, in the flow patterns of the well, a reservoir of the scale inhibitors of my invention. As the oil and water flow through the areas of the reservoir, they will dissolve some of the deposited inhibitor in quantities sufficient to inhibit and ideally to prevent scale deposition.

As will be seen by reference to the above, the solubility of the calcium salt depends on the pH of the solution, being highest at low pH and least at high pH.

I take advantage of this property to deposit the calcium salt in the formation by establishing a high pH, to cause the deposition of the alkaline earth salts in the formation. Because of the limited quantity of the deposited salts, no plugging or substantially increased resistance to fluid flow is encountered. When the formation waters, which are of relatively low pH, in the neighborhood of 6.5 to 7, pass over the calcium salt which is deposited at the higher pH, the salt dissolves and is carried by the formation fluid and acts to inhibit scale formation and corrosion of the lines, pumps and tankage.

I inject into the formation a quantity of a water solution of the calcium salt at a pH of about 6 to about 7.5, containing from about 2 percent to about 50 percent by weight of the calcium salt and preferably from 10 percent to 20 percent of the calcium salt. The quantity injected will depend on the distance to which the injection is desired and the volume of the oil formation in which the salt is to be deposited, giving due regard to the other parameters of the oil formation. I may follow this step with a followup of a water drive using formation water or other suitable injection fluid to move the calcium salt into the formation, to position it in the area adjacent the well but not necessarily contiguous to the well surface.

I follow this injection with an alkaline water solution, for example, a KOH, NaOH or calcium hydroxide solution, in order to raise the pH of the environment of the injected calcium salt to precipitate the salt on the grains of the formation. The quantity of the hydroxide injected should be sufficient to generate a basic pH. Preferably I employ an amount of hydroxide sufficient to neutralize the pH of the calcium salt and to raise the solution to an alkaline pH. I therefore introduce from about 10 to about 20 molar percent stoichiometrically in excess of the unneutralized portion of the calcium salt, employing the alkaline solution in about 5 percent to about 20 percent by weight of the hydroxide. Thus, in the case of the calcium salt referred to above, I will employ four equivalents of hydroxide per mol of calcium salt injected to neutralize the calcium salt and preferably employ 10 to 20 molar percent in excess of said four equivalents, i.e., about 4.4 to about 4.8 equivalents.

As the formation fluid is produced, the water content which is at a lower pH will dissolve some of the salt; and, because of the inhibitor action of the salt, will prevent the formation of scale on the well face and the well locus and flow lines.

The calcium salt requirement may be calculated on the basis of the rate of production of water and field data showing the average return of the calcium salt in the produced water. Depending on the formation, the average return rates will be from about 10 to about 50 ppm. of the calcium salt in the formation water. Thus, for example, for an average return of 25 ppm. over a period of a year, with 50 percent to 80 percent of the injected calcium salt returned during that period, an initial injection of about 300 to about 600 pounds of calcium salt would be suitable.

The following is one example of this application of my method to a producing oil well.

A well which, due to scaling, had its production rate reduced to 80 barrels per day, cutting 80 percent water. The well was shut down, and 110 gallons of the calcium salt of compounds produced according to example 1 in 50 percent by weight solution at a pH of 7 were introduced into the well, which had been suitably drawn down.

The compound in the well was pressured with 100 barrels of production water, to force the calcium salt solution into the formation.

A solution of Ca(OH)$_2$ of 100 pounds dissolved in 4 barrels of water was pressured into the formation. This was followed with 300 barrels of produced water, to push the injected reagents into the formation to the depth required. The flow return showed that the formation fluid picked up the inhibitor and that the system was protected.

The following data give the concentration of the compound in the formation fluid, expressed as parts per million of phosphate ion, determined in the manner described above.

Immediately after treatment: 75 p.p.m. PO$_4$ ion
Two weeks later: 75 p.p.m. PO$_4$ ion Five weeks later: 40 p.p.m. $PO_4$ ion
Four months later: 20 p.p.m. $PO_4$ ion The system shows no sign of scaling. The production rate had increased from 80 to 100 barrels per day after the first month, and the production rate has been sustained.

Where the porosity of the formation is low, for example, of an order of magnitude in millidarseys, a polyalkylene polyamino polykis methylene phosphonic acid is suitable and desirable. I may employ the acids previously described. For example, I may and preferably do employ the dihexylene triamino pentakis phosphonic acid in amounts substantially equal to the molar quantity of the calcium salt as described above, in similar concentrations by weight. I may but need not necessarily follow this injection with a 5 percent to 15 percent calcium chloride solution, to generate some calcium salt, i.e., equivalent to 5 percent to 25 percent conversion of the acid to the salt form described above.

Where the formations are excessively tight, I avoid the introduction of any alkaline solution as was employed in the case of the calcium salt injection previously described.

After injection of the polyalkylene polyamino polykis methylene phosphonic acids as described above, the well is allowed to equilibrate for a period of time, for example, for 24 hours, before resuming production.

When the concentration of the polyalkylene polyamino polykis methylene phosphonic acid compound in the returned water drops below about 5 to 15 p.p.m. or where the total recovered compound is from about 35 percent to about 50 percent of the amount injected, the treatment may be repeated.

While I have described particular embodiments of my invention for the purpose of illustration, it should be understood that various modifications and adaptations thereof may be made within the spirit of the invention, as set forth in the appended claims.

I claim:

1. A method of treatment of wells which comprises introducing into the formation adjacent a well a solution of a partial calcium salt of a polyalkylene polyamino polykis methylene phosphonic acid, in a concentration in the range of about 2 percent to about 50 percent by weight, and subsequently introducing into the formation adjacent said well an alkaline solution stoichiometrically about 10 percent to about 20 percent in excess of the acid equivalents of said salt.

2. The process of claim 1, in which fluid is withdrawn from said formation, said fluid containing a water solution of said polyalkylene polyamino polykis methylene phosphonic acid salt.

3. The process of claim 2, in which the withdrawal of fluid is interrupted when the concentration of the calcium salt in the withdrawn water is in the range of about 5 to about 15 p.p.m.

4. The method of claim 1, in which the polyalkylene polyamino polykis methylene phosphonic acid has the constitutional formula:

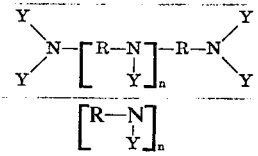

where 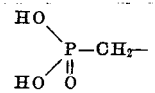

is an alkylene amino methylene phosphonic acid radical containing n moieties, where R is alkylene radical in an uninterrupted chain of from two up to 12 carbons and n is from 1 to 5 moieties, in which at least one of the moieties contains an R of at least 6 carbon atoms, and Y is a methylene phosphonic acid radical:

$$\begin{array}{c} HO \\ \phantom{HO}\diagdown \\ \phantom{HOO}P-CH_2- \\ \phantom{HO}\diagup\| \\ HO\phantom{\diagup}O \end{array}$$

5. The method of claim 4, in which R is $C_6H_{12}$.

6. The method of claim 4, in which R is $C_6H_{12}$ and n is 1, 2, or 3.

7. The method of claim 4, in which the polyalkylene polyamino polykis methylene phosphonic acid or salts thereof are a mixture of dihexylene triamino pentakis methylene phosphonic acid or salts thereof and thihexylene tetramino hexakis methylene phosphonic acid or salts thereof.

8. A method of treatment of wells which comprises introducing into the formation adjacent a well a water solution of a polyalkylene polyamino polykis methylene phosphonic acid, introducing oil into the formation adjacent said well, and subsequently withdrawing fluid from said formation containing said polyalkylene polyamino polykis methylene phosphonic acid.

9. The method of claim 8, in which said polyalkylene polyamino polykis methylene phosphonic acid has the constitutional formula:

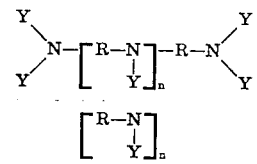

where 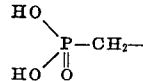

is an alkylene amino methylene phosphonic acid radical containing n moieties, where R is alkylene radical in an uninterrupted chain of from two up to 12 carbons and n is from 1 to 5 moieties, in which at least one of the moieties contains an R of at least six carbon atoms, and Y is a methylene phosphonic acid radical:

$$\begin{array}{c} HO \\ \phantom{HO}\diagdown \\ \phantom{HOO}P-CH_2- \\ \phantom{HO}\diagup\| \\ HO\phantom{\diagup}O \end{array}$$

10. The method of claim 9, in which R is $C_6H_{12}$.

11. The method of claim 9, in which R is $C_6H_{12}$ and n is 1, 2, or 3.

12. The method of claim 9, in which the polyalkylene polyamino polykis methylene phosphonic acid or salts thereof are a mixture of dihexylene triamino pentakis methylene phosphonic acid or salts thereof and trihexylene tetramino hexakis methylene phosphonic acid or salts thereof.

13. A method of prevention of scale formation in wells which comprises introducing into the formation adjacent an oil well a dispersion of about 100 to 1,000 pounds of an oil-soluble polyamine salt of a polyalkylene polyamino polykis methylene phosphonic acid, dissolved in a mixture of an aromatic solvent, a $C_2$ or $C_3$ alkanol, and a nonionic surfactant; subsequently introducing oil into the formation adjacent said well, and subsequently withdrawing fluid from said formation containing said polyalkylene polyamino polykis methylene phosphonic acid salt.

14. The method of claim 13, in which said amine radical is an alkylamido polyalkylene amine salt, $RCOONHR_1NH-R_2-NH_2$; where R is an alkyl chain of $C_5$ to $C_{17}$ carbon atoms and $R_1$ and $R_2$ are alkyl radicals of two to six carbon atoms.

15. The method of claim 13, in which said polyalkylene polyamino polykis methylene phosphonic acid has the constitutional formula:

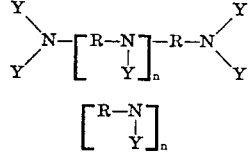

where 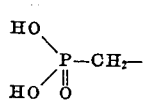

is an alkylene amino methylene phosphonic acid radical containing n moieties, where R is alkylene radical in an uninterrupted chain of from two up to 12 carbons and n is from 1 to 5 moieties, in which at least one of the moieties contains an R of at least six carbon atoms, and Y is a methylene phosphonic acid radical:

$$\begin{array}{c} HO \\ \phantom{HO}\diagdown \\ \phantom{HOO}P-CH_2- \\ \phantom{HO}\diagup\| \\ HO\phantom{\diagup}O \end{array}$$

16. The method of claim 15, in which R is $C_6H_{12}$.

17. The method of claim 15, in which R is $C_6H_{12}$ and $n$ is 1, 2, or 3.

18. The method of claim 15, in which the polyalkylene polyamino polykis methylene phosphonic acid or salts thereof are a mixture of dihexylene triamino pentakis methylene phosphonic acid or salts thereof and trihexylene tetramino hexakis methylene phosphonic acid or salts thereof.

19. The method of claim 16, in which the alkylamido polyalkylene amine is $C_{17}H_{35}\underset{\underset{O}{\|}}{C}NHC_2H_4NHC_2H_4NH_2$.

20. The method of claim 18, in which the alkylamido polyalkylene amine is $C_{17}H_{35}\underset{\underset{O}{\|}}{C}NHC_2H_4NHC_2H_4NH_2$.